US012074374B2

(12) United States Patent
Zhang et al.

(10) Patent No.: US 12,074,374 B2
(45) Date of Patent: Aug. 27, 2024

(54) BASE STATION, AND BROADBAND DUAL-POLARIZED FILTERING MAGNETO-ELECTRIC DIPOLE ANTENNA AND RADIATION UNIT THEREOF

(71) Applicant: South China University of Technology, Guangdong (CN)

(72) Inventors: Xiuyin Zhang, Guangzhou (CN); Shengjie Yang, Guangzhou (CN); Yiyang Liu, Guangzhou (CN); Yunfei Cao, Guangzhou (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 109 days.

(21) Appl. No.: 17/754,291

(22) PCT Filed: Sep. 30, 2020

(86) PCT No.: PCT/CN2020/119662
§ 371 (c)(1),
(2) Date: Mar. 29, 2022

(87) PCT Pub. No.: WO2021/068852
PCT Pub. Date: Apr. 15, 2021

(65) Prior Publication Data

US 2022/0359994 A1 Nov. 10, 2022

(30) Foreign Application Priority Data

Oct. 9, 2019 (CN) ......................... 201910953161.5

(51) Int. Cl.

| | |
|---|---|
| ***H01Q 21/06*** | (2006.01) |
| ***H01Q 5/48*** | (2015.01) |
| ***H01Q 21/26*** | (2006.01) |

(52) U.S. Cl.
CPC ............. *H01Q 21/062* (2013.01); *H01Q 5/48* (2015.01); *H01Q 21/26* (2013.01)

(58) Field of Classification Search
CPC ...... H01Q 21/062; H01Q 21/24; H01Q 21/26; H01Q 5/48; H01Q 1/246; H01Q 25/001
See application file for complete search history.

(56) References Cited

U.S. PATENT DOCUMENTS 9,698,486 B2 * 7/2017 Shooshtari ............. H01Q 1/521

FOREIGN PATENT DOCUMENTS

CN 103367897 B 2/2015
CN 105490006 A * 4/2016 ............. H01Q 21/26
(Continued)

OTHER PUBLICATIONS

Chao Feng Ding, Zhang Yao, Xiu Yin Zhang, Yongmei Pan. "Compact Broadband Dual-Polarized Filtering Dipole Antenna With High Selectivity for Base-Station Applications". Article in IEEE Transactions on Antennas and Propagation. Aug. 2018.
(Continued)

*Primary Examiner* — Daniel Munoz
(74) *Attorney, Agent, or Firm* — M&B IP Analysts, LLC

(57) ABSTRACT

Disclosed are a base station, and a broadband dual-polarized filtering magneto-electric dipole antenna and a radiation unit thereof. A radiation structure includes two dipoles with a polarization direction orthogonal to each other. Each dipole includes two radiators arranged opposite to each other. A balun structure includes four balun assemblies, each balun assembly includes two balun grounds arranged opposite to each other at an interval, and a feeder line and an open-stub arranged opposite to each other at an interval and electrically connected to each other. One balun ground is electrically connected to one radiator, the other balun ground is electrically connected to the other adjacent radiator. The feeder
(Continued)

line and one balun ground are arranged opposite to each other at an interval. The open-stub and the other balun ground are arranged opposite to each other at an interval. The balun grounds are arranged between the feeder line and the open-stub.

8 Claims, 10 Drawing Sheets

(56) References Cited

FOREIGN PATENT DOCUMENTS

| | | | |
|---|---|---|---|
| CN | 107230829 | A | 10/2017 |
| CN | 107749518 | A | 3/2018 |
| CN | 107834183 | A | 3/2018 |
| CN | 109004340 | A | 12/2018 |
| CN | 109888478 | A | 6/2019 |
| CN | 110011048 | A | 7/2019 |
| CN | 110444870 | A | 11/2019 |
| WO | 2013109173 | A1 | 7/2013 |

OTHER PUBLICATIONS

First Search: Application No. 2019109531615. Dated Oct. 9, 2019.

Geng Yanfeng, Zhao Kai, Zhao Wenbiao, Chen Xinwei. "Design of Diffirential Dual-Fequency Filting-Antenna". College of Physics and Electronics Engineering, Shanxi University, Taiyuan 030006, China. Apr. 31, 2017.

International Search Report and Written Opinion of International Searching Authority for PCT/CN2020/119662, ISA/CN, Beijing, China, Dated: Dec. 17, 2020.

Supplementary Search: Application No. 2019109531615. Dated Oct. 9, 2019.

The State Intellectual Property Office of People's Republic of China. "First Office Action". Application No. 201910953161.5.

Wenfeng Xie, Yongle Wu. "Design and Implementation of High Performance Filtering Antenna". Beijing University of Posts and Telecommunications. Mar. 6, 2019.

Wu Rui, Prof. Chu Qingxin. "Researches on Miniaturized Multi-mode Broadband Base Station Antennas". A Dissertation Submitted for the Degree of Doctor of Philosophy. South China University of Technology. Guangzhou, China. Oct. 4, 2018.

* cited by examiner

BASE STATION, AND BROADBAND DUAL-POLARIZED FILTERING MAGNETO-ELECTRIC DIPOLE ANTENNA AND RADIATION UNIT THEREOF

CROSS-REFERENCE TO RELATED APPLICATIONS

This application is a national stage filing under 35 U.S.C. § 371 of international application number PCT/CN2020/119662, filed Sep. 30, 2020, which claims priority to Chinese patent application No. 201910953161.5 filed Oct. 9, 2019. The contents of these applications are incorporated herein by reference in their entirety

TECHNICAL FIELD

The disclosure relates to the technical field of wireless communication, and more particularly, to a base station, and a broadband dual-polarized filtering magneto-electric dipole antenna and a radiation unit thereof.

BACKGROUND

With the rapid development of wireless communication technologies, a broadband dual-polarized filtering magneto-electric dipole antenna (hereinafter referred to as magneto-electric dipole antenna) has a good application prospect due to the advantages of wide bandwidth, high directivity, low cross polarization and low back lobe radiation thereof. During the application of a traditional magneto-electric dipole antenna in a multi-band base station array, in order to meet a miniaturization requirement of a base station, radiation units in different operating bands are closely spaced in general, which leads to strong mutual coupling, thus deteriorating overall performance of the magneto-electric dipole antenna.

SUMMARY

Based on this, a base station, a broadband dual-polarized filtering magneto-electric dipole antenna and radiation units thereof are proposed, and mutual coupling between the radiation units is avoided. Therefore, the broadband dual-polarized filtering magneto-electric dipole antenna using the radiation unit has a good performance, the base station using the broadband dual-polarized filtering magneto-electric dipole antenna has a good overall performance.

The technical solutions of the disclosure are as follows.

In one aspect, a radiation unit is provided, including: a radiation structure, wherein the radiation structure comprises two dipoles with a polarization direction orthogonal to each other, and each of the dipoles comprises two radiators arranged opposite to each other; and a balun structure, wherein the balun structure comprises four balun assemblies, each two of the balun assemblies arranged opposite to each other are arranged corresponding to a respective one of the dipoles, and each of the balun assemblies comprises two balun grounds arranged opposite to each other at an interval, and a feeder line and an open-stub arranged opposite to each other at an interval and electrically connected to each other, wherein one of the balun grounds is electrically connected to one of the radiators, the other one of the balun grounds is electrically connected to the other one of the radiators that is adjacent, the feeder line and one of the balun grounds are arranged opposite to each other at an interval, the open-stub and the other one of the balun grounds are arranged opposite to each other at an interval, and the balun grounds are arranged between the feeder line and the open-stub. Two balun grounds of one of the balun assemblies, which are arranged opposite to each other at an interval form a first half-wave resonator for introducing a second radiation suppression zero point at a right side of a passband; and the open-stub forms a second half-wave resonator for introducing a third radiation suppression zero point at the right side of the passband.

When the above-mentioned radiation unit is used, the feed network transmits a signal to the radiation structure through the balun structure, so that the signal can be transmitted and wireless communication can be realized. Under one polarization, the radiation structure can form an electric dipole, and the radiators of the radiation structure form an electric dipole working mode when working. The balun structure can form a magnetic dipole, and the two balun grounds of one of the balun assemblies in the balun structure, which are arranged opposite to each other at an interval, form a magnetic dipole working mode when working. Under the action of radiation cancellation effect, a magneto-electric dipole working mode formed by combining the electrical dipole working mode with the magnetic dipole working mode introduces one first radiation suppression zero point on a left side of the passband, thereby improving passband edge frequency selectivity and out-of-band suppression. Meanwhile, the two balun grounds of one of the balun assemblies in the balun structure, which are arranged opposite to each other at an interval, are equivalent to a first half-wave resonator, so that the radiation of the current can be limited in a resonant state, and one second radiation suppression zero point can be introduced at the right side of the passband, which can also improve the passband edge roll-off and improve the out-of-band suppression. In addition, because the open-stub is equivalent to a second half-wave resonator, an input end of the open-stub is equivalent to an open-circuit status, while it is equivalent to a disconnected status between the open-stub and the balun ground, so that the antenna cannot be effectively excited, so that one third radiation suppression zero point can also be introduced at the right side of the passband, which can also improve the passband edge roll-off and out-of-band suppression. By introducing the three radiation suppression zero points onto the passband, the radiation unit above improves the passband edge frequency selectivity, improves the passband edge roll-off and improves the out-of-band suppression, thereby reducing the coupling to the sideward radiation units working in different frequency bands.

The technical solutions will be further described hereinafter.

In one embodiment, one end of the feeder line is electrically connected to a feed network, the other end of the feeder line is electrically connected to one end of the open-stub, and the other end of the open-stub is arranged at an interval with a bottom portion of the balun grounds.

In one embodiment, the radiation unit further includes an electric conductor, wherein the electric conductor is arranged between the feeder line and the open-stub, one end of the electric conductor is electrically connected to the other end of the feeder line, and the other end of the electric conductor is electrically connected to one end of the open-stub.

In one embodiment, the radiation unit further includes a support, wherein each of the balun assemblies is provided with two supports arranged opposite to each other at an interval, one side of one of the supports is provided with the feeder line and the other side of the support is provided with one of the balun grounds, and one side of the other one of the supports is provided with the other one of the balun grounds and the other side of the other support is provided with the open-stub.

In one embodiment, a length of the open-stub is adjustable. In this manner, the adjusting flexibility is enhanced.

In one embodiment, a surface area of each of the radiators is adjustable. In this manner, the adjusting flexibility is enhanced.

In one embodiment, a surface area of each of the balun grounds is adjustable. In this manner, the adjusting flexibility is enhanced.

In another aspect, a broadband dual-polarized filtering magneto-electric dipole antenna is provided, including a feed network and the radiation unit, wherein one end of the feeder line and one end of each of the balun grounds are both electrically connected to the feed network.

When the above-mentioned broadband dual-polarized filtering magneto-electric dipole antenna is used, the feed network transmits a signal to the radiation structure through the balun structure, so that the signal can be transmitted and wireless communication can be realized. Under one polarization, the radiation unit can form an electric dipole, and the radiators of the radiation structure form an electric dipole working mode when working. The balun structure can form a magnetic dipole, and the two balun grounds of one of the balun assemblies in the balun structure, which are arranged opposite to each other at an interval, form a magnetic dipole working mode when working. Under the action of radiation cancellation effect, a magneto-electric dipole working mode formed by combining the electrical dipole working mode with the magnetic dipole working mode introduces one first radiation suppression zero point on a left side of the passband, thereby improving passband edge frequency selectivity and out-of-band suppression. Meanwhile, the balun structure can form a magnetic dipole, and the two balun grounds of one of the balun assemblies in the balun structure, which are arranged opposite to each other at an interval, can also introduce one second radiation suppression zero point at the right side of the passband, which can also improve the passband edge roll-off and improve the out-of-band suppression. In addition, because the open-stub is equivalent to a second half-wave resonator, one third radiation suppression zero point can also be introduced at the right side of the passband, which can also improve the passband edge roll-off and out-of-band suppression. Moreover, no extra processing costs are brought while improving a filtering performance, which is widely applicable and does not introduce extra insertion loss. By introducing three radiation suppression zero points, the out-of-band radiation on both sides of the passband is suppressed, and the out-of-band suppression of 3.3 GHz to 5 GHz is realized at high frequency. The broadband dual-polarized filtering magneto-electric dipole antenna also has the characteristics of wide working frequency band and high gain, as well as stable pattern lobe in the passband and low cross polarization. Moreover, feed structures of different polarization ports are almost completely symmetrical and have higher isolation. By introducing the three radiation suppression zero points onto the passband, the broadband dual-polarized filtering magneto-electric dipole antenna above improves the passband edge frequency selectivity, improves the passband edge roll-off and improves the out-of-band suppression, and also weakens the mutual coupling between the radiation units. The broadband dual-polarized filtering magneto-electric dipole antenna has a good performance.

In one embodiment, at least two radiation units are provided, and the at least two radiation units are arranged in an array.

In yet another aspect, a base station is provided, including the broadband dual-polarized filtering magneto-electric dipole antenna.

When the above-mentioned base station is used, the feed network transmits a signal to the radiation structure through the balun structure, so that the signal can be transmitted and wireless communication can be realized. Under one polarization, the radiators of the radiation structure of the radiation unit form an electric dipole working mode when working, and the two balun grounds of one of the balun assemblies in the balun structure, which are arranged opposite to each other at an interval, form a magnetic dipole working mode when working. Under the action of radiation cancellation effect, a magneto-electric dipole working mode formed by combining the electrical dipole working mode with the magnetic dipole working mode introduces one first radiation suppression zero point on a left side of the passband, thereby improving passband edge frequency selectivity and out-of-band suppression. Meanwhile, the two balun grounds of one of the balun assemblies in the balun structure, which are arranged opposite to each other at an interval, resonate at half wavelength, which can also introduce one second radiation suppression zero point at the right side of the passband, and can also improve the passband edge roll-off and improve the out-of-band suppression. In addition, due to the half-wavelength resonance of the open-stub, one third radiation suppression zero point can also be introduced at the right side of the passband, which can also improve the passband edge roll-off and out-of-band suppression. By introducing the three radiation suppression zero points onto the passband, the base station above improves the passband edge frequency selectivity, improves the passband edge roll-off and improves the out-of-band suppression, thus reducing the coupling to the sideward radiation units working in different frequency bands. The broadband dual-polarized filtering magneto-electric dipole antenna has a good performance, and the base station has a good overall performance.

DESCRIPTION OF REFERENCE NUMERALS

Figure 1:
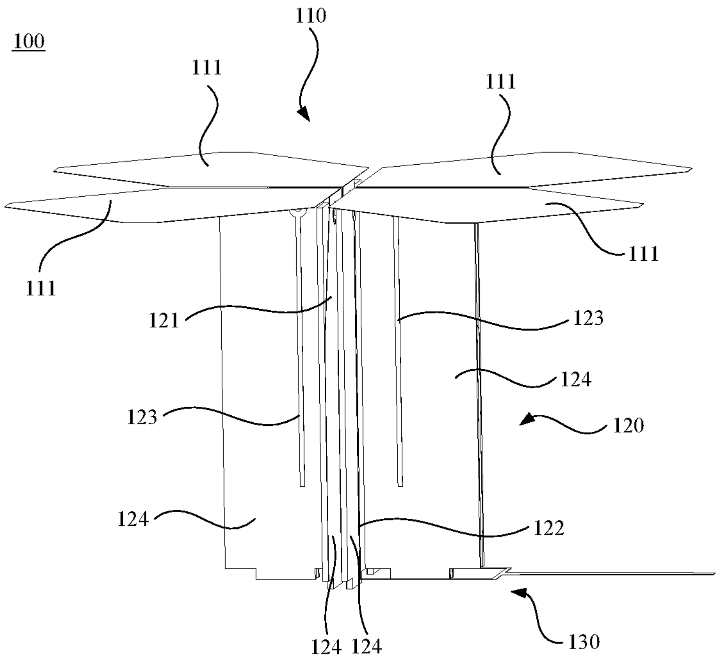
FIG. 1 is a schematic structure diagram of a radiation unit according to one embodiment.

100 refers to radiation unit, 110 refers to radiation structure, 111 refers to radiator, 120 refers to balun structure, 121 refers to balun ground, 122 refers to feeder line, 123 refers to open-stub, 124 refers to support, 125 refers to electric conductor, and 130 refers to feed network.

DETAILED DESCRIPTION

To make the objects, technical solutions, and advantages of the disclosure clearer, the disclosure will be further described in details hereinafter with reference to the accompanying drawings and embodiments. It should be understood that the embodiments described herein are only for the purpose of illustration and explanation of the disclosure and are not intended to limit the protection scope of the disclosure.

It should be noted that when an element is called to be "arranged on" or "fixedly arranged on" another element, it may be directly on another element or there may be an intermediate element. When an element is called to be "fixedly arranged on" another element or "fixedly connected" with another element, they may be detachably fixed or non-detachably fixed. When one element is considered to be "connected" or "rotationally connected" to another element, it may be directly connected to another element or there may be an intermediate element at the same time. Terms such as "vertical", "horizontal", "left", "right", "up", "down" and similar expressions used herein are only for the purpose of illustration and do not mean that they are the only implementations.

Unless otherwise defined, all the technical and scientific terms used herein have the same meanings as those commonly understood by those having ordinary skills in the art. Terms used herein in the specification of the disclosure are for the purpose of describing specific implementations only and are not intended to limit the disclosure. The term "and/or" as used herein includes any and all combinations of one or more of the associated items listed.

The "first", "second", "third" and similar expressions in the disclosure do not represent the specific quantity and sequence, but are only used to distinguish the names.

As shown in FIG. 1 to FIG. 4, in one embodiment, a radiation unit 100 is provided, including: a radiation structure 110, wherein the radiation structure 110 includes two dipoles with a polarization direction orthogonal to each other, and each of the dipoles includes two radiators 111 arranged opposite to each other; and a balun structure 120. The balun structure 120 includes four balun assemblies, each two of the balun assemblies arranged opposite to each other are arranged corresponding to a respective one of the dipoles, and each of the balun assemblies includes two balun grounds 121 arranged opposite to each other at an interval, and a feeder line 122 and an open-stub 123 arranged opposite to each other at an interval and electrically connected to each other, wherein one of the balun grounds 121 is electrically connected to one of the radiators 111, the other one of the balun grounds 121 is electrically connected to the other one of the radiators 111 that is adjacent, the feeder line 122 and one of the balun grounds 121 are arranged opposite to each other at an interval, the open-stub 123 and the other one of the balun grounds 121 are arranged opposite to each other at an interval, and the balun grounds 121 are arranged between the feeder line 122 and the open-stub 123. Two balun grounds 121 of one of the balun assemblies that are arranged opposite to each other at an interval form a first half-wave resonator for introducing a second radiation suppression zero point at a right side of a passband; and the open-stub 123 forms a second half-wave resonator for introducing a third radiation suppression zero point at the right side of the passband.

When the radiation unit 100 according to the foregoing embodiment is used, the feed network 130 transmits a signal to the radiation structure 110 through the balun structure 120, so that the signal can be transmitted and wireless communication can be realized. Under one polarization, the radiation structure 110 can form an electric dipole, and the radiators 111 of the radiation structure 110 form an electric dipole working mode when working. The balun structure 120 can form a magnetic dipole, and the two balun grounds 121 of one of the balun assemblies in the balun structure 120, which are arranged opposite to each other at an interval, form a magnetic dipole working mode when working. Under the action of radiation cancellation effect, a magneto-electric dipole working mode formed by combining the electrical dipole working mode with the magnetic dipole working mode introduces one first radiation suppression zero point on a left side of the passband, thereby improving passband edge frequency selectivity and out-of-band suppression. Meanwhile, the two balun grounds 121 of one of the balun assemblies in the balun structure 120, which are arranged opposite to each other at an interval, are equivalent to a first half-wave resonator, so that the radiation of the current can be limited in a resonant state, and one second radiation suppression zero point can be introduced at the right side of the passband, which can also improve the passband edge roll-off and improve the out-of-band suppression. In addition, because the open-stub 123 is equivalent to a second half-wave resonator, an input end of the open-stub 123 is equivalent to an open-circuit status, while it is equivalent to a disconnected status between the open-stub 123 and the balun ground 121, so that the antenna cannot be effectively excited, so that one third radiation suppression zero point can also be introduced at the right side of the passband, which can also improve the passband edge roll-off and out-of-band suppression. By introducing the three radiation suppression zero points in the passband, the radiation unit 100 according to the foregoing embodiment above improves the passband edge frequency selectivity, improves the passband edge roll-off and improves the out-of-band suppression, thereby reducing the coupling to the sideward radiation units 100 working in different frequency bands.

It should be noted that in the four balun assemblies, two balun assemblies arranged opposite to each other are arranged corresponding to one dipole and transmit the signal transmitted from the feed network 130 to this dipole. Moreover, the polarization directions of the two balun assemblies arranged opposite to each other are mutually orthogonal to the other two balun assemblies which are also arranged opposite to each other. The balun ground 121 may be made of metal sheets or plates, as long as the balun ground 121 can transmit signals from the feed network 130 to the radiator 111. The left side of the passband refers to a low frequency region of the passband, and the right side of the passband refers to a high frequency region of the passband. The radiator 111 and the balun ground 121 above can be designed integrally, thus facilitating machining. The radiator 111 may be arranged on a substrate, which is convenient for supporting.

As shown in FIG. 1 to FIG. 4, in one embodiment, one end of the feeder line 122 is electrically connected to a feed network 130, the other end of the feeder line 122 is electrically connected to one end of the open-stub 123, and the other end of the open-stub 123 and a bottom portion of the balun ground 121 are arranged at an interval. In this way, the open-stub 123 can also introduce one third radiation suppression zero point at the right side of the passband, thereby improving the passband edge roll-off and out-of-band suppression. The bottom of the balun ground 121 refers to one end of the balun ground 121 close to the feed network 130.

Figure 2:
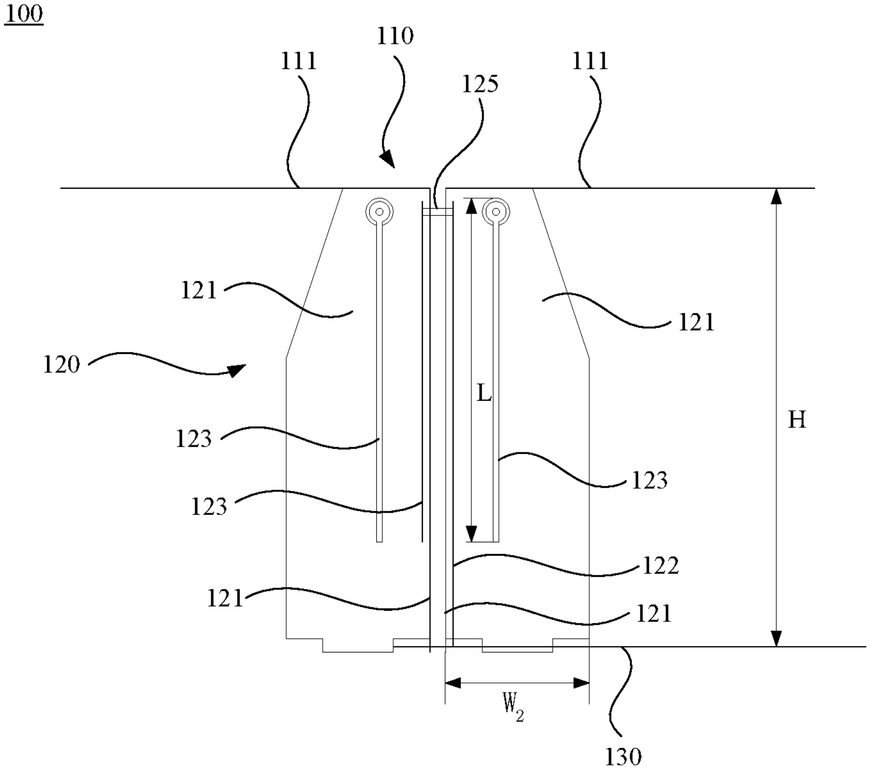
FIG. 2 is a schematic structure diagram of the radiation unit in FIG. 1 from a perspective.
Figure 3:
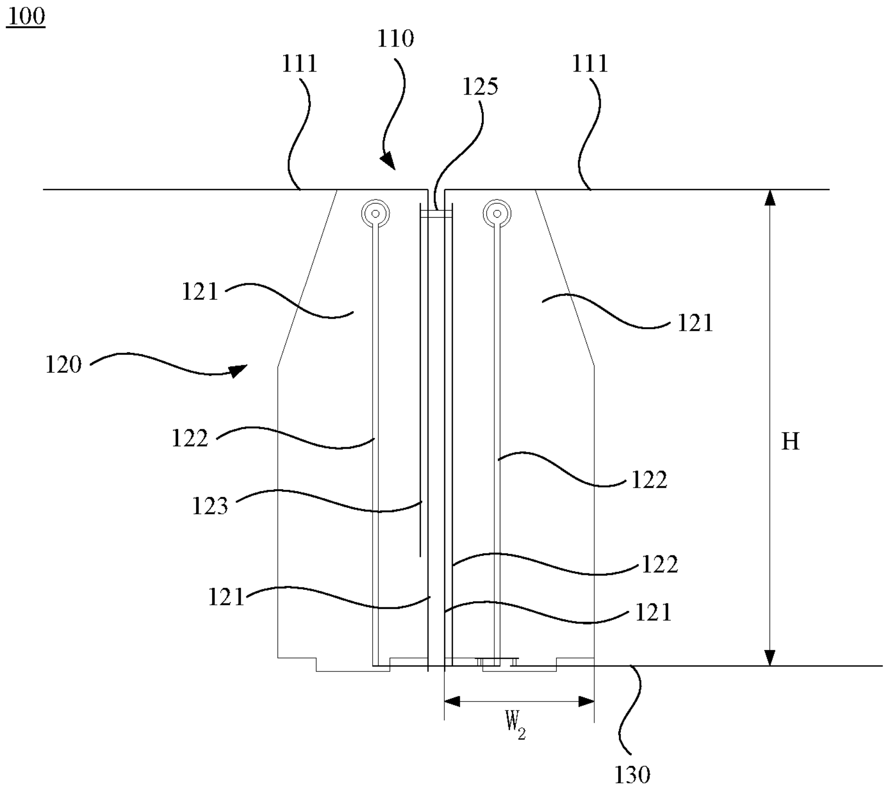
FIG. 3 is a schematic structure diagram of the radiation unit in FIG. 1 from another perspective.
Figure 4:
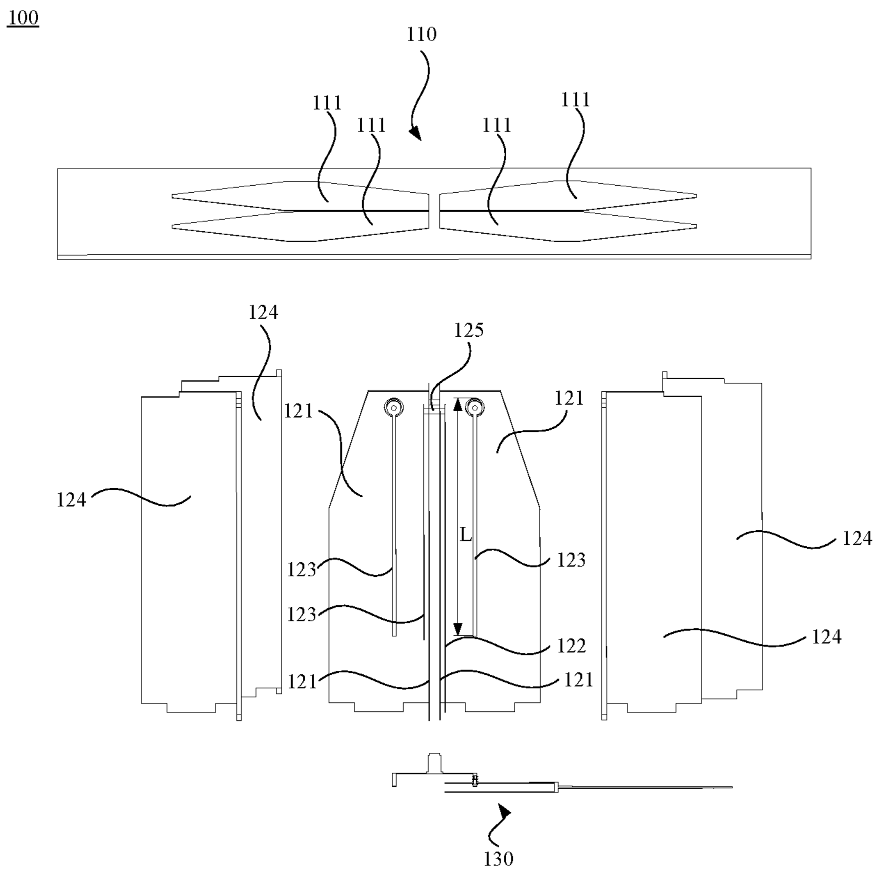
FIG. 4 is an exploded view of the radiation unit in FIG. 1.
Figure 5:
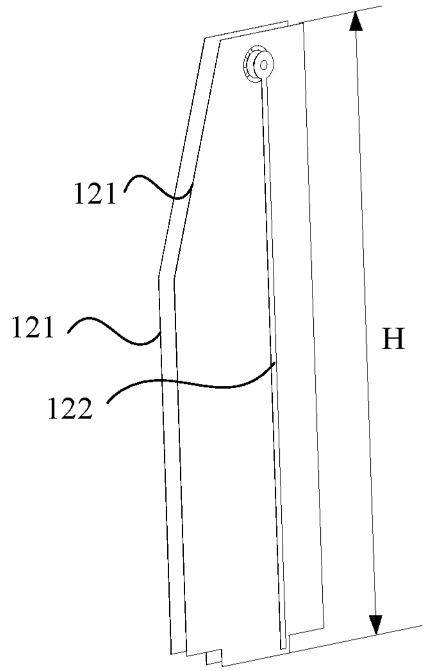
FIG. 5 is a schematic structure diagram of one of the balun assemblies of the radiation unit in FIG. 1 from one perspective.
Figure 6:
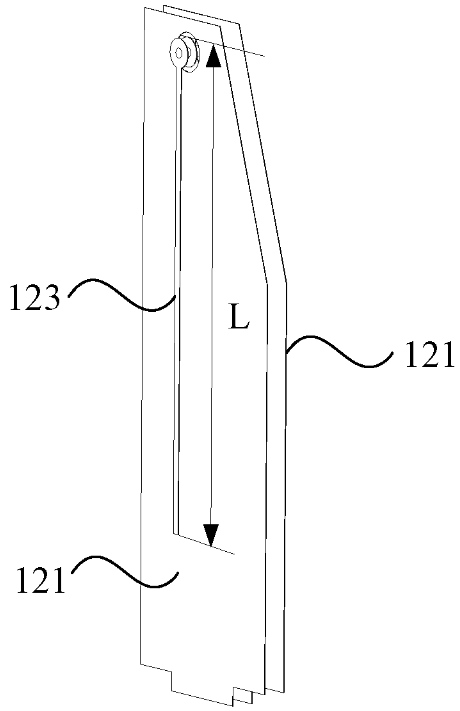
FIG. 6 is a schematic structure diagram of one of the balun assemblies of the radiation unit in FIG. 1 from another perspective.

As shown in FIG. 2 to FIG. 4, in one embodiment, the radiation unit 100 further includes an electric conductor 125, the electric conductor 125 is arranged between the feeder line 122 and the open-stub 123, one end of the electric conductor 125 is electrically connected to the other end of the feeder line 122, and the other end of the electric conductor 125 is electrically connected to one end of the open-stub 123. In this way, the electrical connection between the feeder line 122 and the open-stub 123 is realized by the electric conductor 125, so that the open-stub 123 can also introduce one third radiation suppression zero point at the right side of the passband, thereby improving the passband edge roll-off and out-of-band suppression. The electric conductor 125 may be a conductive element such as a metal wire.

As shown in FIG. 1 and FIG. 4, on the basis of any embodiment mentioned above, the radiation unit 100 further includes a support 124, and each of the balun assemblies is correspondingly provided with two supports 124 arranged opposite to each other at an interval, wherein one side of one support 124 is provided with the feeder line 122 and the other side of the one support 124 is provided with one of the balun grounds 121, and one side of the other support 124 is provided with the other balun ground 121 and the other side of the other support 124 is provided with the open-stub 123. In this way, in one balun assembly, two supports 124 arranged opposite to each other at an interval can support the feeder line 122, the open-stub 123 and the balun ground 121 correspondingly. By arranging the feeder line 122, the open-stub 123 and the balun ground 121 on different sides of the support 124, the feeder line 122 and the balun ground 121 can be arranged opposite to each other at an interval, the open-stub 123 and the balun ground 121 can be arranged opposite to each other at an interval, the balun ground 121 and the balun ground 121 can be arranged opposite to each other at an interval, and the balun grounds 121 can be arranged between the feeder line 122 and the open-stub 123. In addition, the support 124 can also support the radiator 111 correspondingly, so that the radiator 111 can be vertically arranged with the balun ground 121. The support 124 may be a plate structure such as a substrate, which is convenient for the feeder line 122, the open-stub 123 and the balun ground 121 to be attached to different sides, so that the feeder line 122, the open-stub 123 and the balun ground 121 are arranged opposite to each other at an interval. The feeder line 122, the open-stub 123 and the balun ground 121 may be attached to different sides of the substrate by bonding or welding.

In order to meet the actual use requirements, the performance of the radiation unit 100 such as out-of-band suppression needs to be flexibly adjusted to enhance the versatility of use.

On the basis of any of the above embodiments, a length of the open-stub 123 is adjustable. In this way, the open-stub 123 generates one third radiation suppression zero point at an edge of an upper passband. By adjusting the length of the open-stub 123, a frequency of generation of the third radiation suppression zero point is controlled, and a position of the third radiation suppression zero point on the passband is adjusted, so that edge roll-off and out-of-band suppression can be flexibly improved according to the use requirements, and a frequency selectivity of the passband edge is improved. The length of the open-stub 123 may be adjusted by adjusting a distance between the other end of the open-stub 123 and the bottom portion of the balun ground 121.

As shown in FIG. 2, FIG. 4, FIG. 6 and FIG. 9, in one embodiment, the length of the open-stub 123 is L, and 20 mm≤L≤28 mm (L may be 20 mm, 22 mm, 24 mm, 26 mm or 28 mm). When the length of the open-stub 123 is reduced, the position of the third radiation suppression zero point can be moved to a high frequency region of the passband. When the length of the open-stub 123 is increased, the position of the third radiation suppression zero point can be moved to a low frequency region of the passband.

On the basis of any of the above embodiments, a surface area of the radiator 111 is adjustable. In this way, by adjusting the surface area of the radiator 111, a frequency of generation of the third radiation suppression zero point is controlled, and a position of the third radiation suppression zero point on the passband is adjusted, so that edge roll-off and out-of-band suppression can be flexibly improved according to the use requirements, and a frequency selectivity of the passband edge is improved. When the surface area of the radiator 111 is reduced, the position of the third radiation suppression zero point can be moved to a high frequency region of the passband. When the surface area of the radiator 111 is increased, the position of the third radiation suppression zero point can be moved to a low frequency region of the passband.

The surface area of the radiator 111 can be changed by changing a width or length of the radiator 111, and can also be changed by cutting off the radiator 111 correspondingly, as long as the surface area of the radiator 111 can be adjusted. When the radiator 111 is correspondingly cut off, for example, a corner of the radiator 111 may be cut off, so that current in an out-of-band dipole can be reduced, thus suppressing radiation of the dipole in an upper stopband and achieving a higher level of out-of-band suppression.

Figure 7:
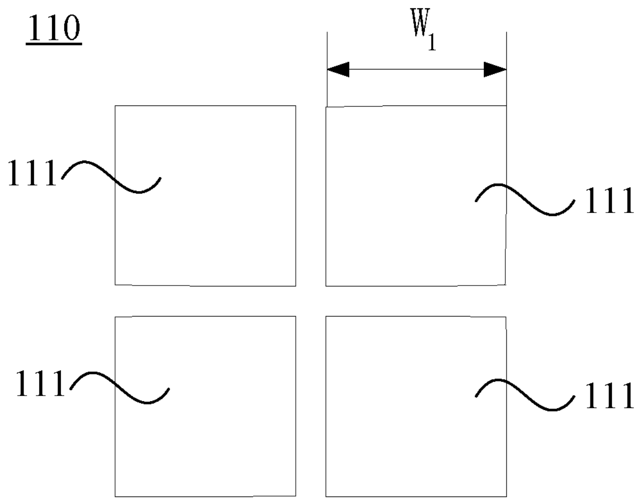
FIG. 7 is a schematic structure diagram of one embodiment of a radiation structure of the radiation unit in FIG. 1.
Figure 10:
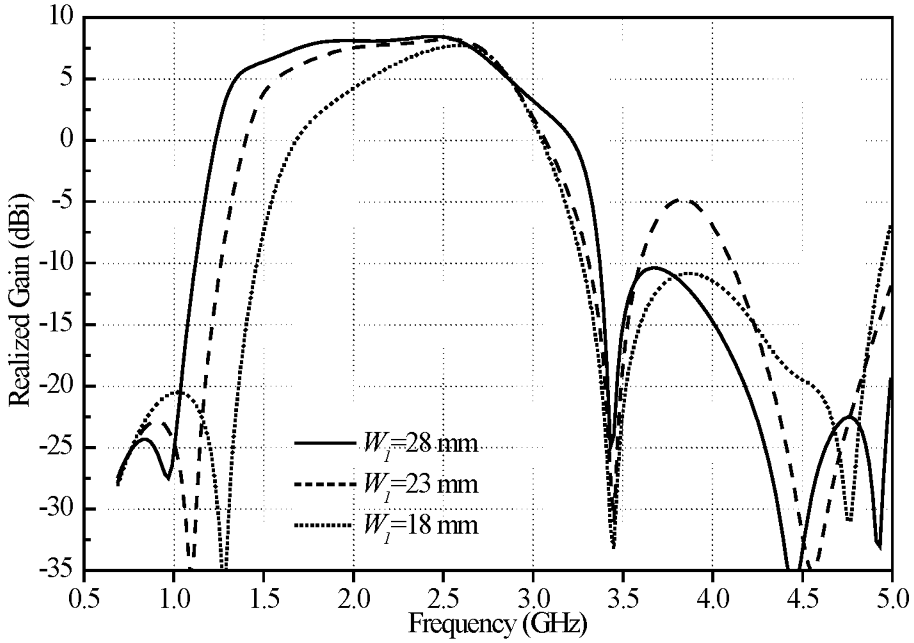
FIG. 10 is an adjustment diagram of the radiation suppression zero point when adjusting a side length of a radiator of the radiation unit in FIG. 1.

As shown in FIG. 7 and FIG. 10, in one embodiment, the radiator 111 is in a square shape, a side length of the radiator 111 is $W_1$, and 16 mm≤$W_1$≤30 mm ($W_1$ may be 16 mm, 18 mm, 23 mm, 28 mm or 30 mm), and the surface area of the radiator 111 may be adjusted by adjusting a side length of the radiator 111. For example, the side length of the radiator 111 may be increased so as to increase the surface area of the radiator 111, thereby moving the position of the third radiation suppression zero point to the low frequency region of the passband. In contrast, the side length of the radiator 111 may be reduced so as to reduce the surface area of the radiator 111, thereby moving the position of the third radiation suppression zero point to the high frequency region of the passband.

Figure 8:
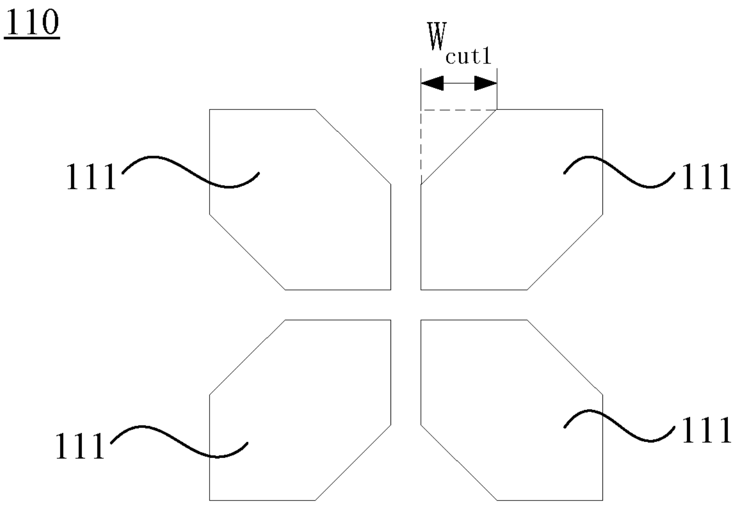
FIG. 8 is a schematic structure diagram of another embodiment of the radiation structure of the radiation unit in FIG. 1.
Figure 9:
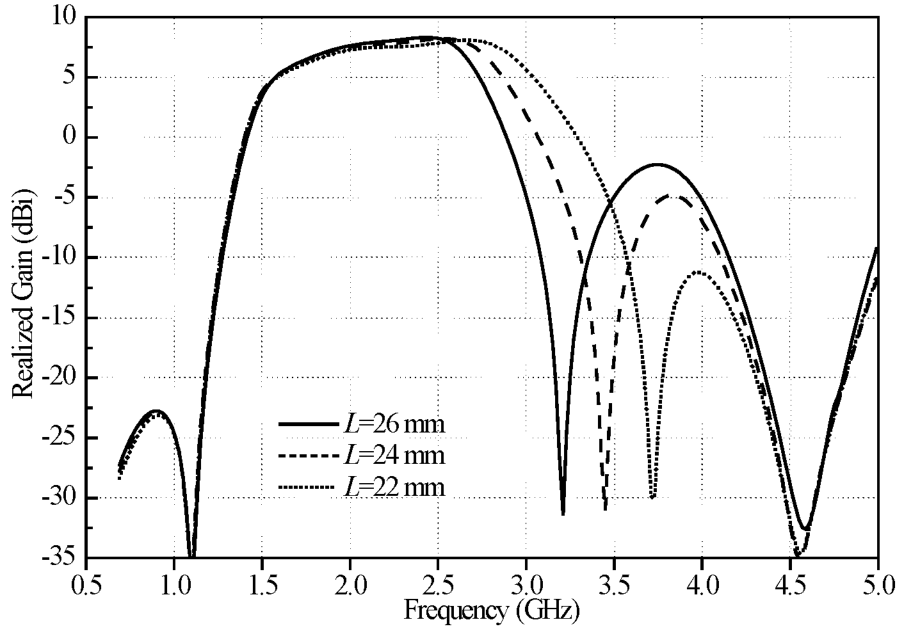
FIG. 9 is an adjustment diagram of a radiation suppression zero point when adjusting an open-stub of the radiation unit in FIG. 1.
Figure 11:
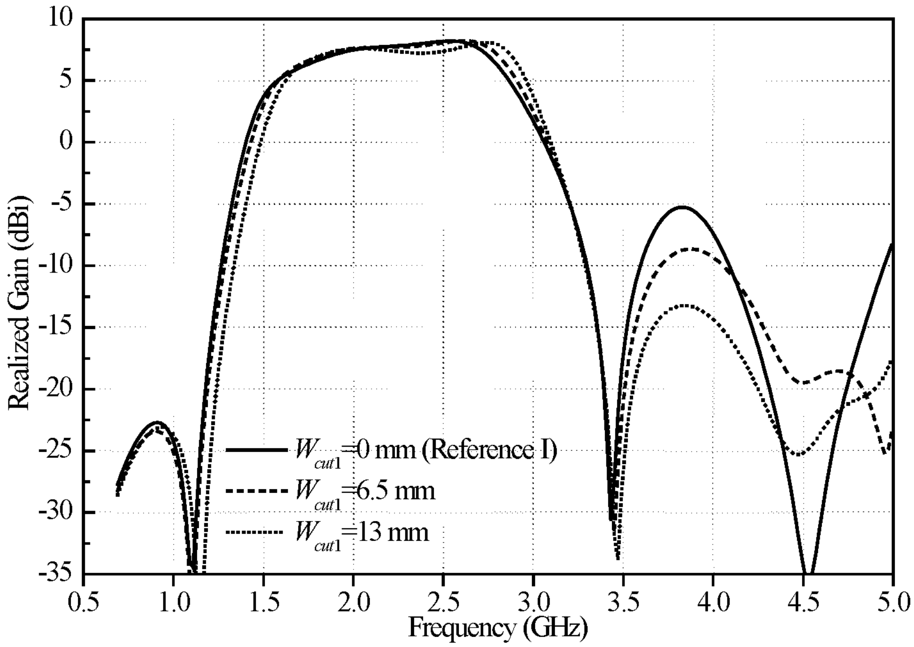
FIG. 11 is an adjustment diagram of the radiation suppression zero point when cutting off the radiator of the radiation unit in FIG. 1.
Figure 12:
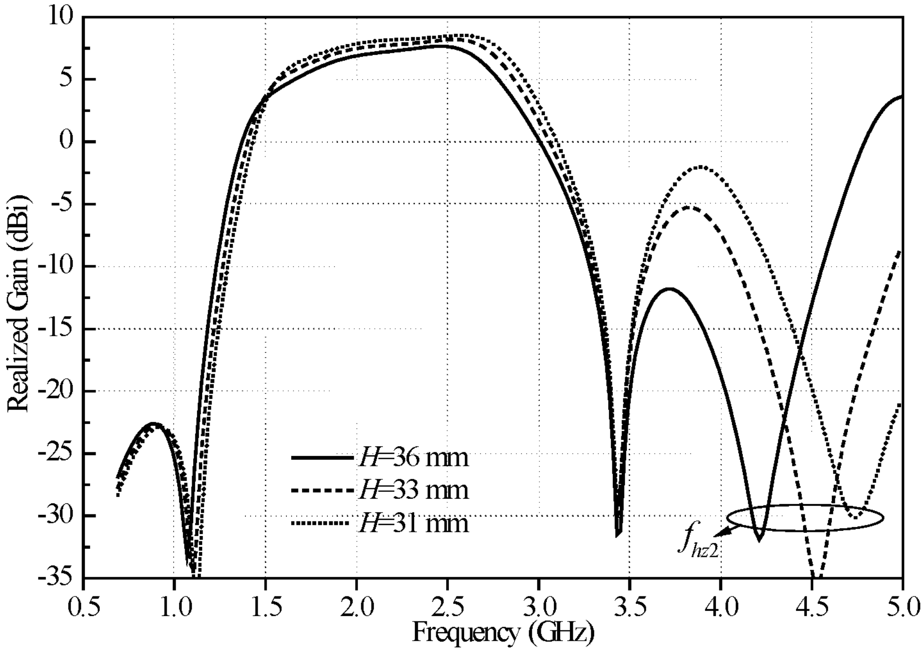
FIG. 12 is an adjustment diagram of the radiation suppression zero point when adjusting a height of a balun ground of the radiation unit in FIG. 1.

As shown in FIG. 8 and FIG. 11, in one embodiment, the radiator 111 is cut off at two opposite corners of the radiator 111, two isosceles right triangles are cut off, a right side of the isosceles right triangle has a length of $W_{cut1}$, and 0 mm≤$W_{cut1}$≤15 mm ($W_{cut1}$ may be 0 mm, 6.5 mm, 13 mm or 15 mm). The surface area of the radiator 111 may be adjusted by adjusting the side length of the right side of the isosceles right triangle. For example, the side length of the right side of the isosceles right triangle may be increased so as to reduce the surface area of the radiator 111, thereby moving the position of the third radiation suppression zero point to the high frequency region of the passband. In contrast, the side length of the right side of the isosceles right triangle may be reduced so as to increase the surface area of the radiator 111, thereby moving the position of the third radiation suppression zero point to the low frequency region of the passband.

On the basis of any of the above embodiments, a surface area of the balun ground 121 is adjustable. In this way, by adjusting the surface area of the balun ground 121, a frequency of generation of the second radiation suppression zero point is controlled, and a position of the second radiation suppression zero point on the passband is adjusted, so that edge roll-off and out-of-band suppression can be flexibly improved according to the use requirements, and a frequency selectivity of the passband edge is improved. When the surface area of the balun ground 121 is reduced, the position of the second radiation suppression zero point can be moved to a high frequency region of the passband. When the surface area of the balun ground 121 is increased, the position of the second radiation suppression zero point can be moved to a low frequency region of the passband.

The surface area of the balun ground 121 can be changed by changing a height of the balun ground 121; can also be changed by changing a width of the balun ground 121, and can also be realized by cutting off the balun ground 121 correspondingly, as long as the surface area of the balun ground 121 can be adjusted. When cutting off the balun ground 121, a corner of the balun ground 121 may be cut off, which is convenient to operate, thus improving impedance matching of right resonance and increasing the bandwidth.

As shown in FIG. 2, FIG. 3, FIG. 5 and FIG. 12, in one embodiment, a height of the balun ground 121 is H, and 30 mm≤H≤40 mm (H may be 30 mm, 31 mm, 33 mm, 36 mm or 40 mm). By adjusting a height of the balun ground 121, the surface area of the balun ground 121 is adjusted. For example, the height of the balun ground 121 may be extended, so that the surface area of the balun ground 121 is increased, so as to move a position of the second radiation suppression zero point to the low frequency region of the passband. In contrast, the height of the balun ground 121 may be shortened, so that the surface area of the balun ground 121 is reduced, so as to move the position of the second radiation suppression zero point to the high frequency region of the passband.

Figure 13:
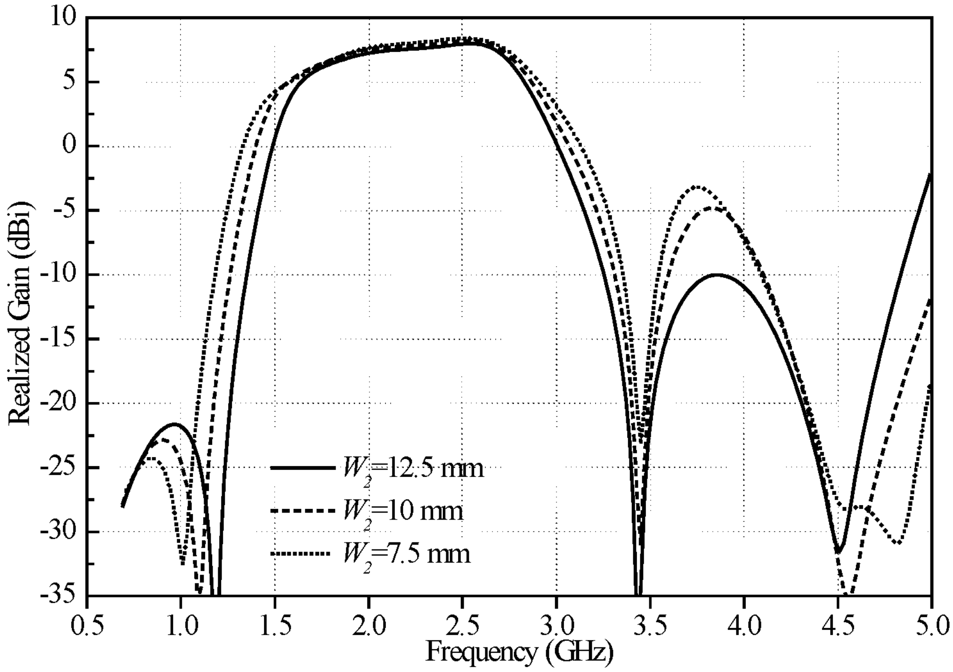
FIG. 13 is an adjustment diagram of the radiation suppression zero point when adjusting a width of the balun ground of the radiation unit in FIG. 1.

As shown in FIG. 2, FIG. 3 and FIG. 13, in one embodiment, a width of the balun ground 121 is $W_2$, and 5 mm≤$W_2$≤15 mm ($W_2$ may be 5 mm, 7.5 mm, 10 mm, 12.5 mm or 15 mm). By adjusting a width of the balun ground 121, the surface area of the balun ground 121 is adjusted. For example, the width of the balun ground 121 may be increased, so that the surface area of the balun ground 121 is increased, so as to move a position of the second radiation suppression zero point to the low frequency region of the passband. In contrast, the width of the balun ground 121 may be reduced, so that the surface area of the balun ground 121 is reduced, so as to move the position of the second radiation suppression zero point to the high frequency region of the passband.

It should be noted that the adjustment of the length of the open-stub 123, the adjustment of the surface area of the radiator 111 and the adjustment of the surface area of the balun ground 121 may be carried out independently or simultaneously, wherein carried out simultaneously means that three or two of them may be carried out simultaneously, thus enhancing the adjusting flexibility.

In one embodiment, a broadband dual-polarized filtering magneto-electric dipole antenna is provided, including a feed network 130 and the radiation unit 100 according to any one of the embodiments mentioned above, wherein one end of the feeder line 122 and one end of the balun ground 121 are both electrically connected to the feed network 130.

When the broadband dual-polarized filtering magneto-electric dipole antenna according to the foregoing embodiment is used, the feed network 130 transmits a signal to the radiation structure 110 through the balun structure 120, so that the signal can be transmitted and wireless communication can be realized. Under one polarization, the radiation unit 110 can form an electric dipole, and the radiators 111 of the radiation structure 110 form an electric dipole working mode when working. The balun structure 120 can form a magnetic dipole, and the two balun grounds 121 of one of the balun assemblies in the balun structure 120, which are arranged opposite to each other at an interval, form a magnetic dipole working mode when working. Under the action of radiation cancellation effect, a magneto-electric dipole working mode formed by combining the electrical dipole working mode with the magnetic dipole working mode introduces one first radiation suppression zero point on a left side of the passband, thereby improving passband edge frequency selectivity and out-of-band suppression. Meanwhile, the two balun grounds 121 of one of the balun assemblies in the balun structure 120, which are arranged opposite to each other at an interval, can also introduce one second radiation suppression zero point at the right side of the passband, which can also improve the passband edge roll-off and improve the out-of-band suppression. In addition, because the open-stub 123 is equivalent to a second half-wave resonator, one third radiation suppression zero point can also be introduced at the right side of the passband, which can also improve the passband edge roll-off and out-of-band suppression. Moreover, no extra processing costs are brought while improving a filtering performance, which is widely applicable and does not introduce extra insertion loss. By introducing three radiation suppression zero points, the out-of-band radiation on both sides of the passband is suppressed, and the out-of-band suppression of 3.3 GHz to 5 GHz is realized at high frequency. The broadband dual-polarized filtering magneto-electric dipole antenna also has the characteristics of wide working frequency band and high gain, as well as stable pattern lobe in the passband and low cross polarization.

Moreover, feed structures of different polarization ports are almost completely symmetrical and have higher isolation. By introducing the three radiation suppression zero points onto the passband, the broadband dual-polarized filtering magneto-electric dipole antenna according to the foregoing embodiment improves the passband edge frequency selectivity, improves the passband edge roll-off and improves the out-of-band suppression, and also weakens the mutual coupling between the radiation units. The broadband dual-polarized filtering magneto-electric dipole antenna has a good performance.

It should be noted that the feed network 130 may be any existing structure that can feed the radiation unit 100. The broadband dual-polarized filtering magneto-electric dipole antenna above excites the radiation structure 110 by feeding the balun structure 120, so that the magneto-electric dipole antenna itself produces a good band-pass filtering effect.

In one embodiment, at least two radiation units 100 are provided, and the at least two radiation units 100 are arranged in an array. In this way, the broadband dual-polarized filtering magneto-electric dipole antenna can form a dual-frequency or multi-frequency antenna array, which can weaken a problem of pattern distortion caused by mutual coupling between different frequency bands.

Figure 14:
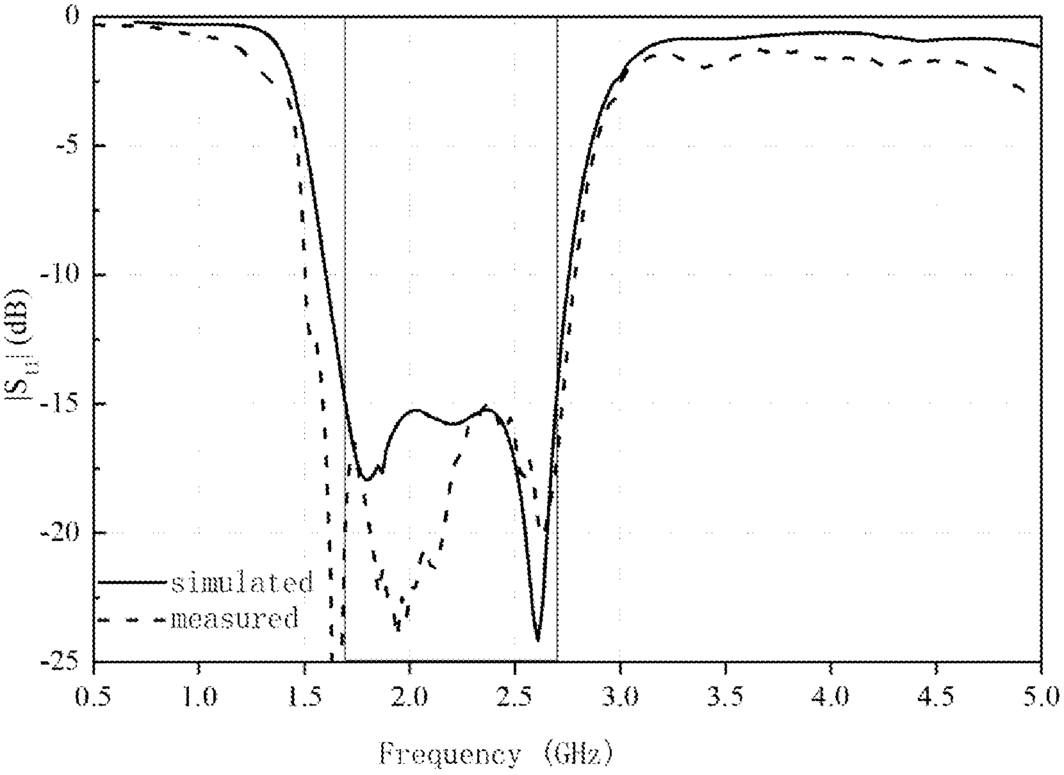
FIG. 14 is a simulation and measurement diagram of a reflection factor S11-frequency and gain curve-frequency of a broadband dual-polarization filtering magneto-electric dipole antenna according to one embodiment.
Figure 15:
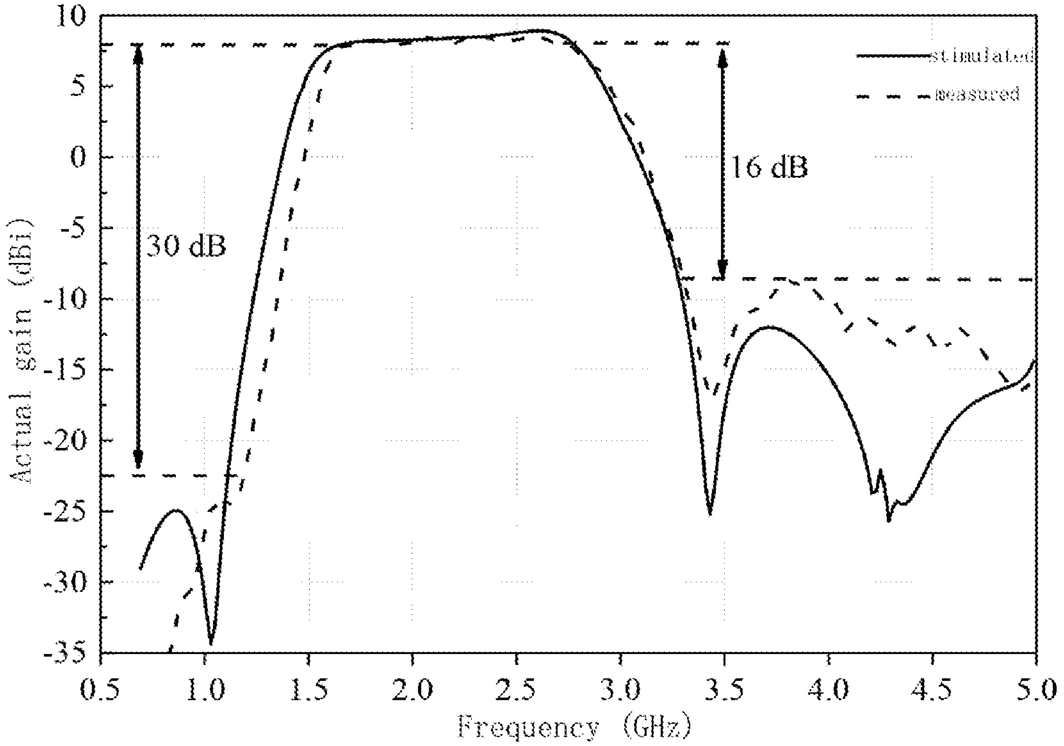
FIG. 15 is a simulation and measurement diagram of a reflection factor S11-frequency and gain curve-frequency of a broadband dual-polarization filtering magneto-electric dipole antenna according to another embodiment.

In one embodiment, the simulation and measurement of a reflection factor S11-frequency and gain curve-frequency of the broadband dual-polarized filtering magneto-electric dipole antenna are shown in FIG. 14 and FIG. 15. The impedance matching in the passband is good, an impedance bandwidth ranges from 1.65 GHz to 2.75 GHz, and all return losses are below −15 dB. The gain in a working frequency band is about 8.1 dBi, and both sides of the passband have high roll-off filtering characteristics, and the filtering suppression of 0 GHz to 1.25 GHz exceeding 30 dB and the filtering suppression of 3.3 GHz to 5 GHz exceeding 16 dB are realized.

Figure 16:
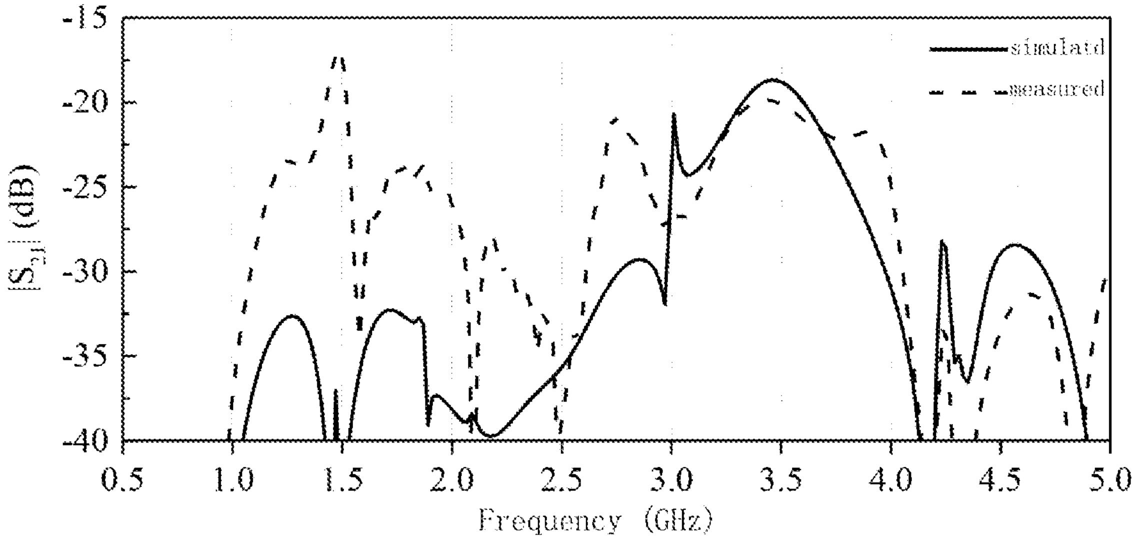
FIG. 16 is a simulation and measurement diagram of a transmission factor S21-frequency of a broadband dual-polarization filtering magneto-electric dipole antenna according to one embodiment.

In one embodiment, the simulation and measurement of a transmission factor S21-frequency of the broadband dual-polarized filtering magneto-electric dipole antenna are shown in FIG. 16. The isolation of two ports in the passband is good, both of which are below −25 dB.

In one embodiment, a base station is also provided, including the broadband dual-polarized filtering magneto-electric dipole antenna according to any one of the embodiments mentioned above.

When the base station according to the foregoing embodiment is used, the feed network 130 transmits a signal to the radiation structure 110 through the balun structure 120, so that the signal can be transmitted and wireless communication can be realized. Under one polarization, the radiators 111 of the radiation structure 110 of the radiation unit 100 form an electric dipole working mode when working, and the two balun grounds 121 of one of the balun assemblies in the balun structure 120, which are arranged opposite to each other at an interval, form a magnetic dipole working mode when working. Under the action of radiation cancellation effect, a magneto-electric dipole working mode formed by combining the electrical dipole working mode with the magnetic dipole working mode introduces one first radiation suppression zero point on a left side of the passband, thereby improving passband edge frequency selectivity and out-of-band suppression. Meanwhile, the two balun grounds 121 of one of the balun assemblies in the balun structure 120, which are arranged opposite to each other at an interval, resonate at half wavelength, which can also introduce one second radiation suppression zero point at the right side of the passband, and can also improve the passband edge roll-off and improve the out-of-band suppression. In addition, due to the half-wavelength resonance of the open-stub 123, one third radiation suppression zero point can also be introduced at the right side of the passband, which can also improve the passband edge roll-off and out-of-band suppression. By introducing the three radiation suppression zero points onto the passband, the base station according to the foregoing embodiment improves the passband edge frequency selectivity, improves the passband edge roll-off and improves the out-of-band suppression, thus reducing the mutual coupling to the sideward radiation units 100 working in different frequency bands. The broadband dual-polarized filtering magneto-electric dipole antenna has a good performance, and the base station has a good overall performance.

The technical features of the above embodiments can be combined in any way. In order to simplify the description, not all the possible combinations of the technical features of the above embodiments are described. However, as long as there is no contradiction in the combinations of these technical features, they should be considered as the scope recorded in this specification.

The above embodiments merely express several implementations of the disclosure, and the descriptions thereof are relatively specific and detailed, but cannot be understood as a limitation to the scope of the invention patent. It should be noted that those of ordinary skills in the art may make several deformations and improvements without departing from the conception of the disclosure, and these deformations and improvements shall all fall within the protection scope of the disclosure. Therefore, the protection scope of the invention patent should be subjected to the claims appended.

The invention claimed is:

1. A radiation unit, comprising:

a radiation structure, wherein the radiation structure comprises two dipoles with a polarization direction orthogonal to each other, and each of the dipoles comprises two radiators arranged opposite to each other, wherein under one polarization, the radiation structure forms an electric dipole, and the radiators of the radiation structure of the radiation unit form an electric dipole working mode when working; and a balun structure, wherein the balun structure comprises four balun assemblies, each two of the balun assemblies arranged opposite to each other are arranged corresponding to a respective one of the dipoles, and each of the balun assemblies comprises two balun grounds arranged opposite to each other at an interval, and a feeder line and an open-stub arranged opposite to each other at an interval and electrically connected to each other, wherein one of the balun grounds is electrically connected to one of the radiators, the other one of the balun grounds is electrically connected to the other one of the radiators that is adjacent, the feeder line and one of the balun grounds are arranged opposite to each other at an interval, the open-stub and the other one of the balun grounds are arranged opposite to each other at an interval, and the balun grounds are arranged between the feeder line and the open-stub;

wherein, two balun grounds of one of the balun assemblies, which are arranged opposite to each other at an interval form a first half-wave resonator for introducing a second radiation suppression zero point at a right side of a passband, by adjusting surface area of the balun ground, a frequency of generation of the second radiation suppression zero point is controlled, and radiation of the current is limited in a resonant state at the second radiation suppression zero point;

wherein the balun structure forms a magnetic dipole, and the two balun grounds of one of the balun assemblies in the balun structure, which are arranged opposite to each other at an interval, form a magnetic dipole working mode when working, under an action of radiation cancellation effect, a magneto-electric dipole working mode formed by combining the electric dipole working mode with the magnetic dipole working mode introduces one first radiation suppression zero point on a left side of the passband;

and the open-stub forms a second half-wave resonator for introducing a third radiation suppression zero point at the right side of the passband, by adjusting surface area of the radiator, a frequency of generation of the third radiation suppression zero point is controlled, and at the third radiation suppression zero point, an input end of the open-stub is equivalent to an open-circuit status, while it is equivalent to a disconnected status between the open-stub and the balun ground;

wherein return losses in a working frequency band of the passband are below −15 dB, and a gain of the working frequency band of the passband is 8.1 dBi;

wherein the left side of the passband refers to a low frequency region of the passband, and the right side of the passband refers to a high frequency region of the passband.

2. The radiation unit according to claim 1, wherein one end of the feeder line is electrically connected to a feed network, the other end of the feeder line is electrically connected to one end of the open-stub, and the other end of the open-stub is arranged at an interval with a bottom portion of the balun grounds.

3. The radiation unit according to claim 2, further comprising an electric conductor, wherein the electric conductor is arranged between the feeder line and the open-stub, one end of the electric conductor is electrically connected to the other end of the feeder line, and the other end of the electric conductor is electrically connected to one end of the open-stub.

4. The radiation unit according to claim 1, further comprising a support, wherein each of the balun assemblies is provided with two supports arranged opposite to each other at an interval, one side of one of the supports is provided with the feeder line and the other side of the support is provided with one of the balun grounds, and one side of the other one of the supports is provided with the other one of the balun grounds and the other side of the other support is provided with the open-stub.

5. The radiation unit according to claim 1, wherein a length of the open-stub is adjustable.

6. A broadband dual-polarized filtering magneto-electric dipole antenna, comprising:

a feed network and a radiation unit comprising:

a radiation structure, wherein the radiation structure comprises two dipoles with a polarization direction orthogonal to each other, and each of the dipoles comprises two radiators arranged opposite to each other, wherein under one polarization, the radiation structure forms an electric dipole, and the radiators of the radiation structure of the radiation unit form an electric dipole working mode when working; and a balun structure, wherein the balun structure comprises four balun assemblies, each two of the balun assemblies arranged opposite to each other are arranged corresponding to a respective one of the dipoles, and each of the balun assemblies comprises two balun grounds arranged opposite to each other at an interval, and a feeder line and an open-stub arranged opposite to each other at an interval and electrically connected to each other, wherein one of the balun grounds is electrically connected to one of the radiators, the other one of the balun grounds is electrically connected to the other one of the radiators that is adjacent, the feeder line and one of the balun grounds are arranged opposite to each other at an interval, the open-stub and the other one of the balun grounds are arranged opposite to each other at an interval, and the balun grounds are arranged between the feeder line and the open-stub;

wherein, two balun grounds of one of the balun assemblies, which are arranged opposite to each other at an interval form a first half-wave resonator for introducing a second radiation suppression zero point at a right side of a passband, by adjusting surface area of the balun ground, a frequency of generation of the second radiation suppression zero point is controlled, and radiation of the current is limited in a resonant state at the second radiation suppression zero point;

wherein the balun structure forms a magnetic dipole, and the two balun grounds of one of the balun assemblies in the balun structure, which are arranged opposite to each other at an interval, form a magnetic dipole working mode when working, under an action of radiation cancellation effect, a magneto-electric dipole working mode formed by combining the electric dipole working mode with the magnetic dipole working mode introduces one first radiation suppression zero point on a left side of the passband;

and the open-stub forms a second half-wave resonator for introducing a third radiation suppression zero point at the right side of the passband, by adjusting surface area of the radiator, a frequency of generation of the third radiation suppression zero point is controlled, and at the third radiation suppression zero point, an input end of the open-stub is equivalent to an open-circuit status, while it is equivalent to a disconnected status between the open-stub and the balun ground;

wherein return losses in a working frequency band of the passband are below −15 dB, and a gain of the working frequency band of the passband is 8.1 dBi;

wherein the left side of the passband refers to a low frequency region of the passband, and the right side of the passband refers to a high frequency region of the passband;

wherein one end of the feeder line and one end of each of the balun grounds are both electrically connected to the feed network.

7. The broadband dual-polarized filtering magneto-electric dipole antenna according to claim 6, wherein the radiation unit is provided in at least two, and the at least two radiation units are arranged in an array.

8. A base station, comprising a broadband dual-polarized filtering magneto-electric dipole antenna comprising:

a feed network and a radiation unit comprising:

a radiation structure, wherein the radiation structure comprises two dipoles with a polarization direction orthogonal to each other, and each of the dipoles comprises two radiators arranged opposite to each other, wherein under one polarization, the radiation structure forms an electric dipole, and the radiators of the radiation structure of the radiation unit form an electric dipole working mode when working; and a balun structure, wherein the balun structure comprises four balun assemblies, each two of the balun assemblies arranged opposite to each other are arranged corresponding to a respective one of the dipoles, and each of the balun assemblies comprises two balun grounds arranged opposite to each other at an interval, and a feeder line and an open-stub arranged opposite to each other at an interval and electrically connected to each other, wherein one of the balun grounds is electrically connected to one of the radiators, the other one of the balun grounds is electrically connected to the other one of the radiators that is adjacent, the feeder line and one of the balun grounds are arranged opposite to each other at an interval, the open-stub and the other one of the balun grounds are arranged opposite to each other at an interval, and the balun grounds are arranged between the feeder line and the open-stub;

wherein, two balun grounds of one of the balun assemblies, which are arranged opposite to each other at an interval form a first half-wave resonator for introducing a second radiation suppression zero point at a right side of a passband, by adjusting surface area of the balun ground, a frequency of generation of the second radiation suppression zero point is controlled, and radiation of the current is limited in a resonant state at the second radiation suppression zero point;

wherein the balun structure forms a magnetic dipole, and the two balun grounds of one of the balun assemblies in the balun structure, which are arranged opposite to each other at an interval, form a magnetic dipole working mode when working, under an action of radiation cancellation effect, a magneto-electric dipole working mode formed by combining the electric dipole working mode with the magnetic dipole working mode introduces one first radiation suppression zero point on a left side of the passband;

and the open-stub forms a second half-wave resonator for introducing a third radiation suppression zero point at the right side of the passband, by adjusting surface area of the radiator, a frequency of generation of the third radiation suppression zero point is controlled, and at the third radiation suppression zero point, an input end of the open-stub is equivalent to an open-circuit status, while it is equivalent to a disconnected status between the open-stub and the balun ground;

wherein return losses in a working frequency band of the passband are below −15 dB, and a gain of the working frequency band of the passband is 8.1 dBi;

wherein the left side of the passband refers to a low frequency region of the passband, and the right side of the passband refers to a high frequency region of the passband;

wherein one end of the feeder line and one end of each of the balun grounds are both electrically connected to the feed network; and wherein the radiation unit is provided in at least two, and the at least two radiation units are arranged in an array.

* * * * *